March 23, 1954
L. KUCERA
2,672,692
MULTISCALE RULE
Filed Nov. 7, 1952
2 Sheets-Sheet 1
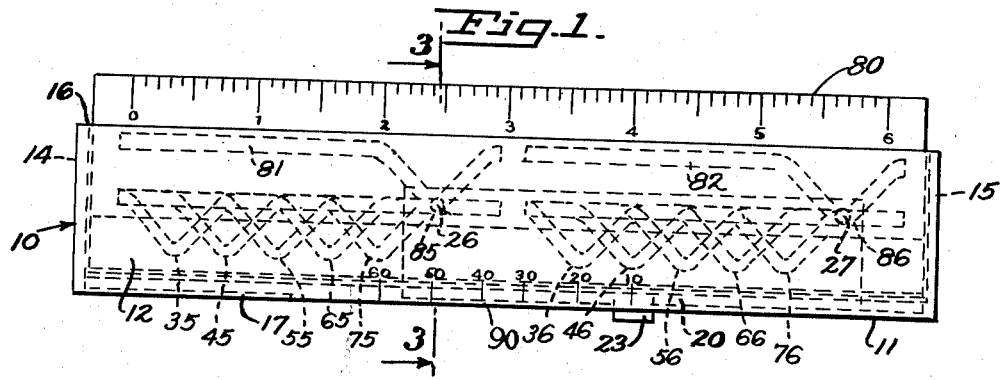
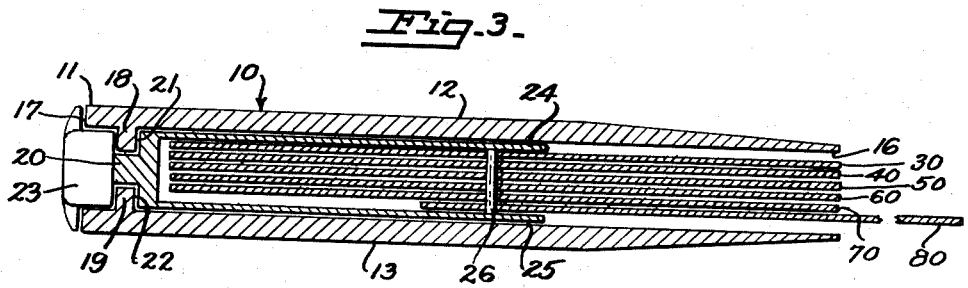
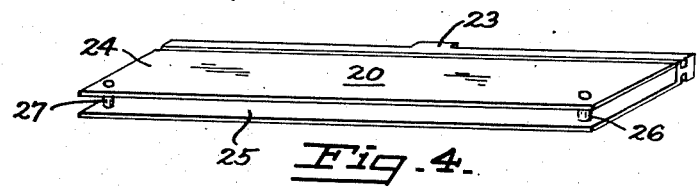
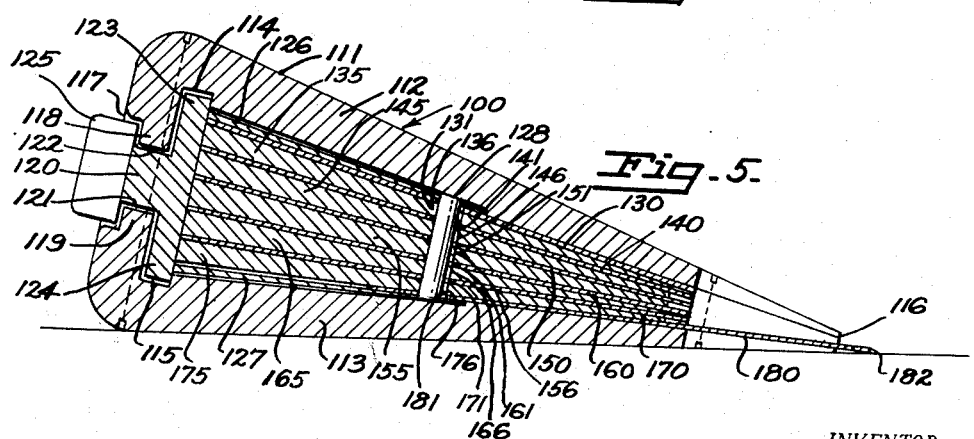
INVENTOR.
LADA KUCERA
BY
ATTORNEY March 23, 1954     L. KUCERA     2,672,692
MULTISCALE RULE Filed Nov. 7, 1952     2 Sheets-Sheet 2

INVENTOR.
LADA KUCERA
BY
ATTORNEY

Patented Mar. 23, 1954

2,672,692

UNITED STATES PATENT OFFICE 2,672,692

MULTISCALE RULE

Lada Kucera, Berkeley, Calif.

Application November 7, 1952, Serial No. 319,285

10 Claims. (Cl. 33—107)

My invention relates to improvements in multiscale rules.

The relatively awkward triangular rules heretofore in use were thick and unwieldy and could accommodate only six scales on each rule. Even relatively simple work required two such rules—one with six architects' scales and the other with six engineers' scales. Furthermore, not only were they awkward to use, they were very inconvenient to carry around.

These and other difficulties and problems have been solved by my invention. In a single compact instrument a number of instantly available, flat, thin scales are provided. A housing five-sixteenths of an inch thick can accommodate six independent scale members, both sides of which are available for use, so that a complete set of both architects' and engineers' scales may be provided. The device may be made in any size, with more or fewer scales; it may be made in a pocket size, little thicker than a slide rule and of almost any desired length and width. All these scales are maintained in a predetermined order, and one at a time may be projected forward for use. Since the order remains the same, no time need be lost in fumbling to find any particular scale. Moreover, the device is relatively simple in construction, so that it may be manufactured inexpensively from a relatively small number of simple parts.

In general my invention includes a hollow housing that contains a number of thin flat members having scales marked on both sides of one edge, which will be termed the forward edge. The forward edge of the housing is open for the projection of each scale outwardly therethrough. A guide means is provided adjacent the rear edge of the housing, along which a control member may slide. Each scale is provided with a plurality (usually two) collinear slots that lie generally parallel to the forward edge, and the slots for the different scale members generally overlie each other. Each slot has a dip, whose location is different for each scale member. The control member has a plurality (usually a pair) of selection posts, which extend perpendicular to the scale members, passing through all the slots. As the control member is slid in the guide, the posts select one scale at a time by engaging the dips in the slots. That scale whose dips are engaged by the posts is projected forwardly, out the housing opening into its position of use. In this manner, the movement of the control member successively projects and withdraws each one of the scales in its proper order.

Other features, objects, and advantages of the invention will appear from the following description of two preferred embodiments thereof, both described at length in accordance with United States Revised Statutes, Section 4888. The invention, however, is not intended to be limited narrowly to the enumerated details, but is rather defined in the appended claims.

In the drawings:

Fig. 1 is a plan view of a multiscale rule embodying the principles of my invention, one of the scales being shown projected out to its position of use.

Fig. 3 is an enlarged view in section, taken along the line 3—3 in Fig. 1. Due to the enlargement and to space requirements of the drawing, the scale that is projected out has been broken apart.

Fig. 4 is an isometric view of the control member by itself, looking at its forward portion and showing the selection posts that ride in the positioning slots of the scale members.

Fig. 5 is a view similar to Fig. 3 of a modified form of the invention.

Figure 2:
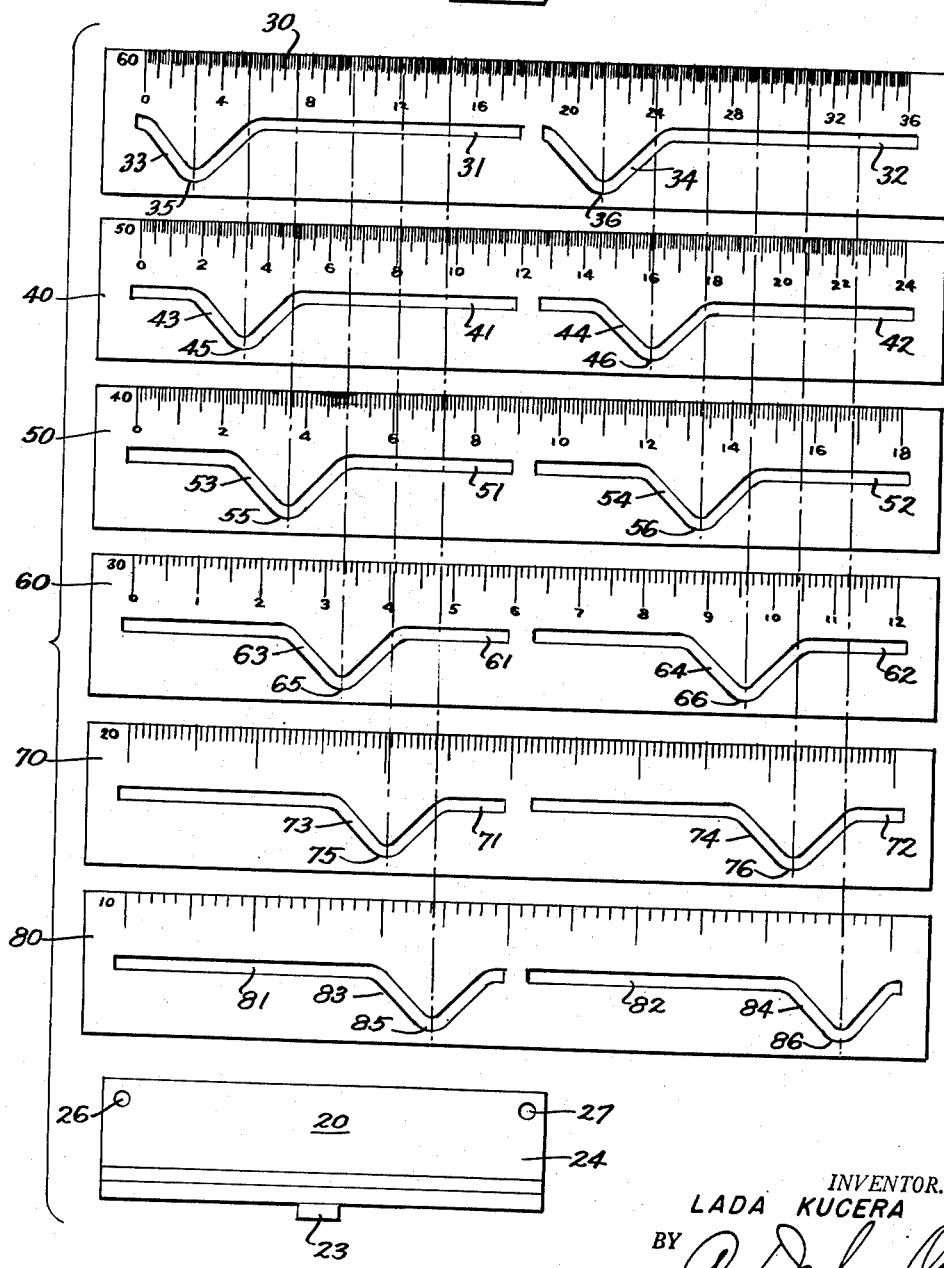
Fig. 2 is a plan view showing all of the scale members of Fig. 1 and the control member, disassembled from the device as a whole and placed adjacent one another, thereby showing the relative shapes of their positioning slots.

The multiscale rule 10 shown in Figs. 1 and 3 includes a hollow housing or frame 11 that holds all the remaining parts. The housing 11 preferably comprises two parallel plates 12 and 13 secured to and spaced apart by a pair of spacer members 14 and 15, one at each end, so that the front and rear edges 16 and 17 are both open.

Adjacent the rear edge 17 and parallel to it, the plates 12 and 13 may be provided with respective inturned flanges or tongues 18 and 19 that face one another. The flanges 18 and 19 serve as guides for a control member 20 whose grooves 21 and 22 engage the flanges 18 and 19 so that the control member 20 may be slid back and forth along the rear edge 17 by pushing a tab 23 that projects out from the rear of the control member 20. In place of the flanges 18 and 19, the plates 12 and 13 may be slotted and the flanges or tongues may be on the control member 20; or still other types of guide means may be provided for enabling the control member to slide freely with respect to the housing 11 while being maintained parallel to the rear edge 17.

The control member 20 is provided with a pair of forwardly-extending members 24 and 25, which may be flat rectangular plates that are spaced apart from each other and provide support for a pair of selection posts 26 and 27 that extend generally perpendicular to the plates 12, 13, 24, and 25, in the form of the invention shown in Figs. 1–4. The posts 26 and 27 are preferably spaced apart a distance a little less than half the interior length between the spacer members 14 and 15 and are spaced at a convenient location between the front and rear edges 16 and 17, generally about half way between.

Between the members 24 and 25, I prefer to retain a plurality of individual, preferably rectangular, scale members 30, 40, 50, 60, 70, and 80 (although six scale members are shown in the drawing and are therefore referred to in the description, there may, of course, be more or fewer of them). The forward edges of each scale member 30, 40, 50, 60, 70, and 80 is scaled off, usually on both sides; an architect's scale may be on one side of each member and an engineer's scale on the other side, or other types of scales may be provided.

Each scale 30, 40, 50, 60, 70, 80 is provided with a plurality (here two are shown) of slots 31, 32, 41, 42, 51, 52, 61, 62, 71, 72, and 81, 82. The slots on any one scale are preferably collinear and for most of their length are parallel to the forward edge 16, because this is the easiest way to insure proper parallel movement of the scales. Also, the slots for all the scales are in general alignment, so that the post 26 passes through and engages all the slots 31, 41, 51, 61, 71, and 81, while the post 27 passes through and engages all the slots 32, 42, 52, 62, 72, and 82.

The only portion of each slot 31, 32, 41, 42, 51, 52, 61, 62, 71, 72, 81, 82 that is not parallel to the front edge 16 is a dip portion 33, 34, 43, 44, 53, 54, 63, 64, 73, 74, and 83, 84. Each dip has a respective bottom point 35, 36, 45, 46, 55, 56, 65, 66, 75, 76, 85, 86, where the slot is furthest from its normal path, the part that lies parallel to the edges 16 and 17. As Figs. 1 and 2 show the dips 33, 34, 43, 44, 53, 54, 63, 64, 73, 74, 83, 84 occur at a different position along the length for each scale and that in no two scales do they occur at the same position. However, the distance between the dips (e. g., 33 and 34) and the distance between the dip bottoms or minima (e. g., 35 and 36) is a constant for all the scales being equal to the distance between the posts 26, 27.

In operation, the rule 10 may be carried with none of the scale members 30, 40, 50, 60, 70, 80 projecting beyond the housing 11. When any desired scale is to be used, the tab 23 is pushed to slide the control member 20 along. The posts 26, 27 then move along the slots 31, 32, 41, 42, 51, 52, 61, 62, 71, 72, 81, 82. So long as the dip portion 33, 34, 43, 44, 53, 54, 63, 64, 73, 74, 83, 84 of any scale is not engaged by the posts 26, 27, that scale remains in its retracted position. When, however, the posts 26, 27 engage the dip portions 33, 34 of the slots 31, 32, the scale 30 is projected out beyond the front edge 16 of the housing 11, reaching its position of use when the posts 26, 27 engage the minima 35, 36. Further movement of the posts 26, 27 in the same direction (left to right in Figs. 1 and 2) retracts the scale 30 and projects the scale 40. The scale 40 is then retracted and the scale 50 projected. Still further movement of the control member 20 projects and then retracts the scales 60, 70, and 80, the position of projection of the scale 80 being shown in Fig. 1. When in its position of use, both sides of the scale are available, and the operator may use whichever one his work calls for.

All the parts of the rule 10 may be made from plastic, wood, or metal, or some of them may be made from one material and others from a different material. The compact assembly of thin scales that comprises the rule 10 may easily be carried in a man's pocket, providing twelve scales available instantly.

A modified form of the invention is shown in Fig. 5. Basically, the rule 100 is similar to the rule 10, having a housing 111, a control member 120 slidable along the housing 111 and a set of thin flat scale members 130, 140, 150, 160, 170, 180 that are retained inside the housing 111 by the control member 120. Again the projection and retraction of the scales are controlled by posts sliding along slots in the same basic way as for the rule 10. For that reason, only the one view, a sectional view, is shown, because that illustrates the principal differences between the rule 100 and the rule 10.

The housing 111 is wedge-shaped, comprising two wedge-shaped members 112 and 113 open at their forward edges 116 and having an open slot 117 at their rear edge. Rear flanges 118 and 119 are provided, together with slots 114 and 115, to guide the slots 121 and 122 of the control member 120 and its projecting tongues 123, 124. The button or tab 125 causes the control member 120 to slide relatively to the housing 111. The members 126, 127 of the control member 120 extend toward the forward edge 116 and converge somewhat toward each other; though they do not touch. One post 128 is shown and one set of slots 131, 141, 151, 161, 171, and 181. The slot pattern may be the same as before. For longer rules, there may be three, four, five or more collinear slots on each scale and a corresponding number of selection posts.

Between each adjacent pair of scales 130, 140, 150, 160, 170, 180, is placed a wedge-shaped filler member 135, 145, 155, 165, and 175, each having a set of slots 136, 146, 156, 166, and 176 that have no dip and all extend parallel to the front edge 116. The taper of the wedges is so designed that when each scale 130, 140, 150, 160, 170, 180 is serially projected forward through the open edge 116, it will reach a position of use with its own forward edge 182 at the same place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

As shown in Fig. 1, an index scale 90 may extend along the rear edge 17 of the rule 10, on both sides 12 and 13 of the rule housing 11. The position of the knob or tab 23 with respect to the different markings shows the current position of the control member 20 and which scale is now projected. It also shows which direction the control member 20 must be moved to reach another desired scale, and how far to go. For example, Fig. 1 shows that the scale 60 which indicates tenths of an inch is now in position, and if the scale that indicates fortieths of an inch is desired, the control member 20 must be moved to the left three notches or dips, until the tab 23 is opposite the marking 40. Then the scale 50, marked in fortieths of an inch, will be projected.

I claim:

1. A multiscale rule, including in combination a hollow housing having a lengthwise opening extending across its forward edge; a plurality of scale members, each having a plurality of slots, each slot having a portion parallel to the forward edge of said housing and a dip portion; the dip portion for each scale being located at a different lengthwise position for each scale; and means for engaging said slots and thereby projecting each scale member successively, by engagement with its dip portion.

2. A multiscale rule, including in combination a hollow housing having a lengthwise opening extending across its forward edge; a control means slidable lengthwise in said housing and including means for retaining a plurality of posts spaced between said front and rear edges; and a plurality of scale members, each having a plurality of slots through which said posts extend, each slot having a portion parallel to the forward edge of said housing and a dip portion, the dip portion for each scale being located at a different lengthwise position for each scale, whereby successive engagement of said dips by said posts when said control means is slid relatively to said housing will serially project and retract each scale, one at a time.

3. A multiscale rule, including in combination: a hollow housing having a lengthwise opening extending across its forward edge and an opening extending across at least a portion of its rear edge; a control means slidable lengthwise in said housing parallel to said rear edge and having a portion extending out through said rear opening, said control means including a plurality of posts inside said housing; and a plurality of scale members perpendicular to said posts, each having a plurality of collinear slots through which said posts extend, each slot having a portion parallel to the forward edge of said housing and a dip portion, the dip portion being located at a different lengthwise position for each scale, whereby successive engagement of said dips by said posts when said control means is slid relatively to said housing will serially project and retract each scale, one at a time.

4. A multiscale rule, including in combination: a hollow housing comprising a pair of spaced apart plates held together at their ends to provide lengthwise openings extending across their forward and rear edges, said plates having inturned flanges adjacent to and parallel to the rear edge and directly opposite one another; a control member having a pair of slots engaging said flanges so that said member is slidable lengthwise in said housing parallel to said rear edge, said member having a portion extending out through said rear opening and also having a pair of forwardly extending portions supporting a plurality of selection posts between them; and a plurality of thin flat rectangular scale members in between said control member's forwardly-extending portions, each having a plurality of collinear slots through which said posts extend, each slot having its major portion parallel to the forward edge of said housing and having a portion divergent therefrom to trace a dip, said dip portion being located at a different lengthwise position for each scale, whereby successive engagement of said dips by said posts when said control member is slid relatively to said housing will serially project and retract each scale, one at a time.

5. A multiscale rule, including in combination: a hollow housing comprising a pair of parallel spaced apart rectangular plates held together at their ends to provide lengthwise openings extending across their forward and rear edges, said plates having inturned flanges adjacent to and parallel to the rear edge and directly opposite one another; a control member having a pair of slots engaging said flanges so that said member is slidable lengthwise in said housing parallel to said rear edge, said member having a tab portion extending out through said rear opening and also having a pair of forwardly-extending, spaced-apart, flat, parallel portions supporting a pair of selection posts perpendicularly between them; and a plurality of thin flat rectangular scale members in between said control member's forwardly-extending portions, each having a pair of collinear slots through each of which one of said posts extends, each slot having its major portion parallel to the forward edge of said housing and having a portion divergent therefrom to trace a dip, said dip portion being located at a different lengthwise position for each scale, whereby successive engagement of said dips by said posts when said control member is slid relatively to said housing will serially project and retract each scale, one at a time.

6. A multiscale rule, including in combination: a hollow housing comprising a pair of converging, spaced apart, generally wedge-shaped plates held together at their ends to provide lengthwise openings extending across their forward and rear edges, said plates having inturned flanges adjacent to and parallel to the rear edge and directly opposite one another; a control member having a pair of slots engaging said flanges so that said member is slidable lengthwise in said housing parallel to said rear edge, said member having a tab portion extending out through said rear opening and also having a converging spaced-apart pair of forwardly extending portions supporting a plurality of selection posts across them; a plurality of thin flat rectangular scale members in between said control member's forwardly-extending portions, each having a plurality of collinear slots through which said posts extend, each slot having its major portion parallel to the forward edge of said housing and having a portion divergent therefrom to trace a dip, said dip portion being located at a different lengthwise position for each scale, whereby successive engagement of said dips by said posts when said control member is slid relatively to said housing will serially project and retract each scale, one at a time; and a wedge-shaped filler member between each pair of adjacent scale members, said filler members having slots in line with said scale members' slots but entirely parallel to said forward edge, so that said filler members remain stationary when said posts are moved, the angles of said filler members and said housing plates being such that the forward edge of each of said scale members reaches the same position of furthest extent when projected out.

7. A multiscale rule, including in combination: a hollow frame member open across both lengthwise edges and provided with guide means adjacent to and parallel to the rear lengthwise edge; a plurality of thin, flat, generally rectangular scale members, each having a scaled forward edge and a plurality of closed collinear slots parallel to the forward edge of said housing except for dip portions, the dip portions for the slots of each scale being located at the same distance apart and in a different lengthwise position from that of the other scales; and a selector control member mostly inside said frame and provided with a plurality of posts corresponding in number to the number of slots on each scale and extending through the corresponding slots of all the scales, said selector control member having guide means adapted to cooperate with said frame guide means for sliding movement with respect to said frame, whereby successive engagement of said dips by said posts when said selector control member is slid relatively to said housing will serially project and retract each scale, one at a time.

8. A multiscale rule, including in combination: a hollow frame member open across both lengthwise edges and provided with guide means adjacent to and parallel to the rear lengthwise edge; a plurality of thin, flat, generally rectangular scale members forming a stack with the members parallel, each having a scaled forward edge and a pair of closed collinear slots parallel to the forward edge of said housing except for dip portions, the dip portions for the slots of each scale being located at the same distance apart and in a different lengthwise position from that of the other scales; and a selector control member mostly inside said frame and provided with a pair of posts perpendicular to said scale members, corresponding in number to the number of slots on each scale, and extending through the corresponding slots of all the scales, said selector control member having guide means adapted to cooperate with said frame guide means for sliding movement with respect to said frame, whereby successive engagement of said dips by said posts when said selector control member is slid relatively to said housing will serially project and retract each scale, one at a time.

9. A multiscale rule, including in combination: a hollow wedge-shaped frame member open across both lengthwise edges and provided with guide means adjacent to and parallel to the rear lengthwise edge; a plurality of thin, flat, generally rectangular scale members, each having a scaled forward edge and a plurality of closed collinear slots parallel to the forward edge of said housing except for dip portions, the dip portions for the slots of each scale being located at the same distance apart and in a different lengthwise position from that of the other scales; a plurality of wedge-shaped filler members, one between each adjacent pair of scale members, and having slots corresponding to said scale members' slots but having no dip portion; and a selector control member mostly inside said frame and provided with a plurality of posts corresponding in number to the number of slots on each scale and extending through the corresponding slots of all the scales and filler members, said selector control member having guide means adapted to cooperate with said frame guide means for sliding movement with respect to said frame, whereby successive engagement of said dips by said posts when said selector control member is slid relatively to said housing will serially project and retract each scale, one at a time, the surface angles of said filler members and housing being such that each scale when projected fully will reach the same position with its forward edge.

10. A multiscale rule including in combination: a hollow frame member open at its forward edge and having a slot extending through its rear edge; a plurality of scale members normally retained inside said frame and adapted to be projected one at a time through the open forward edge; and scale control means having a handle projecting out said rear slot for moving any one of said scale members out beyond said forward edge at any one time, said same scale control means also serving positively to retract each projected scale member at the time the next scale member is being moved out.

LADA KUCERA.

References Cited in the file of this patent

UNITED STATES PATENTS

| Number | Name | Date |
|---|---|---|
| 1,728,900 | Madsen | Sept. 17, 1929 |
| 2,322,248 | Miller | June 22, 1943 |
| 2,634,504 | Jennings | Apr. 14, 1952 |

FOREIGN PATENTS

| Number | Country | Date |
|---|---|---|
| 126,509 | Sweden | Oct. 25, 1949 |